Sept. 7, 1965 H. R. KILLIAN 3,204,927
BUTTERFLY VALVE WITH PARTICULAR STRUCTURE
FOR MAKING AN INTEGRAL SEAT
Filed April 17, 1961 2 Sheets-Sheet 1

Inventor:
Henry R Killian
By: Hofgren, Brady, Wegner,
Allen & Stellman
Attorneys Sept. 7, 1965 H. R. KILLIAN 3,204,927
BUTTERFLY VALVE WITH PARTICULAR STRUCTURE
FOR MAKING AN INTEGRAL SEAT
Filed April 17, 1961 2 Sheets-Sheet 2
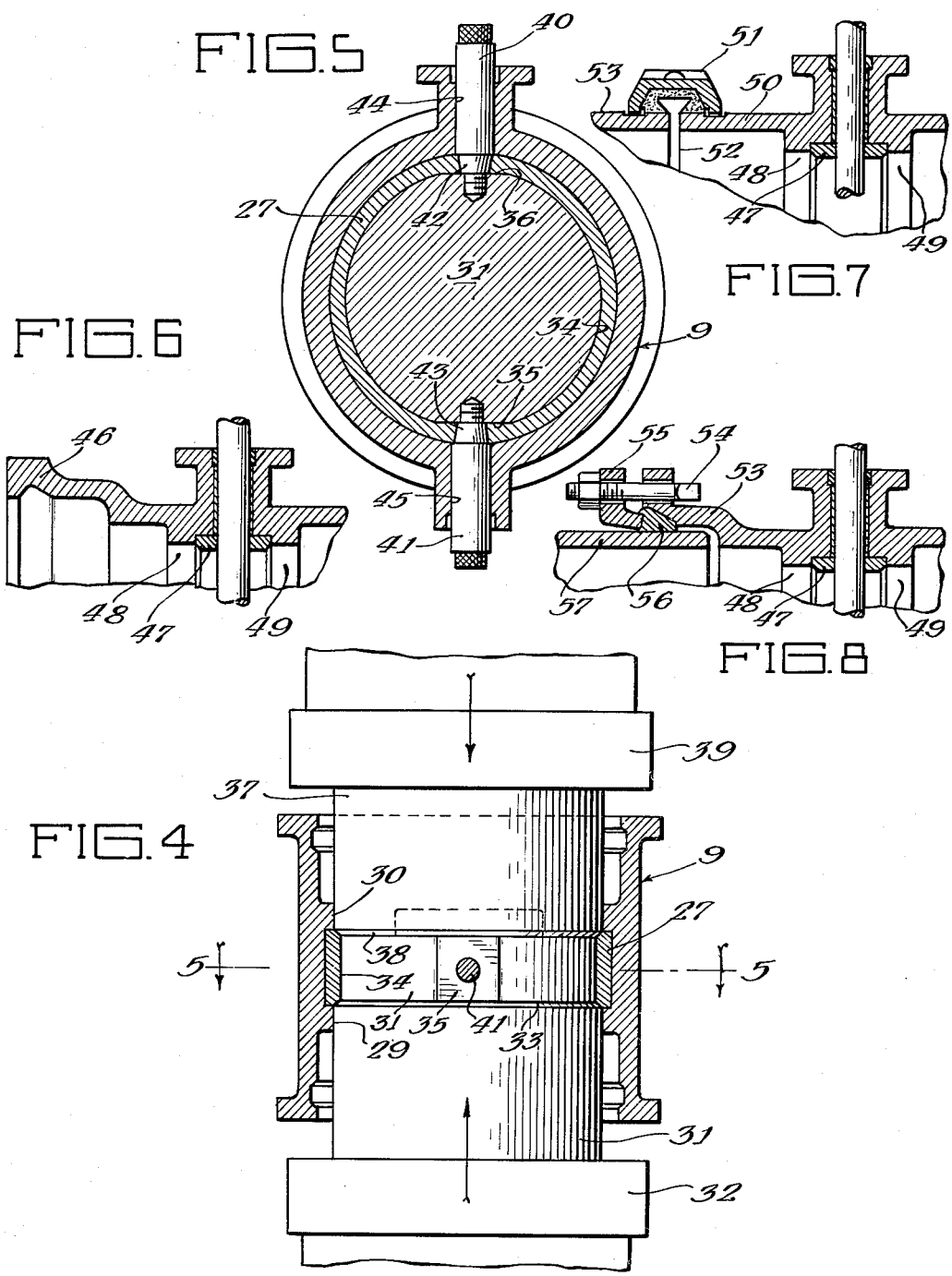

United States Patent Office 3,204,927
Patented Sept. 7, 1965

---

3,204,927
BUTTERFLY VALVE WITH PARTICULAR STRUCTURE FOR MAKING AN INTEGRAL SEAT
Henry R. Killian, Chicago, Ill., assignor to Henry Pratt Company, a corporation of Illinois
Filed Apr. 17, 1961, Ser. No. 103,491
5 Claims. (Cl. 251—306)

This invention relates to a butterfly valve structure and methods employed for the manufacture of such valves.

The particular butterfly valves with which this invention is concerned are those in which the valve body or housing has flanges of one type or another for connection with adjoining pipe sections. The valve has a closure or disc mounted on a shaft rotatable through about 90° in trunnion bearings in the housing to open and close the valve. When open, the valve disc sits in the flow of fluid through the valve. When closed, the periphery of the disc engages a resilient seat which is molded in place in the valve housing and thus permanently bonded to the metal of the housing.

The primary object of this invention is to provide a novel valve structure which provides new and improved operation and novel methods for accomplishing its manufacture.

Another object is to obtain a butterfly valve which can be manufactured accurately at less expense than heretofore, while obtaining a valve longer lasting in use.

Another object is to provide a butterfly type valve in which the housing can be cast requiring very little machining to condition the housing for receiving an accurately made resilient seat. The accuracy of manufacture also permits an interchangeability of parts heretofore found difficult to achieve.

Other objects, features and advantages of the present invention will be apparent from the following description of embodiments of the invention illustrated in the accompanying drawings in which:

FIGURE 4 is an elevational view partly in section of the valve housing in a press and mold for receiving the resilient seat.

FIGURE 5 is a horizontal sectional view through the valve mold and seat taken substantially along line 5—5 of FIGURE 4.

FIGURES 6, 7 and 8 are fragmentary sectional views through the upper portion of the valve similar to the showing of FIGURE 3, illustrating the form of the flanges of valves equipped for connection to pipe lines in different manners.

Figure 2:
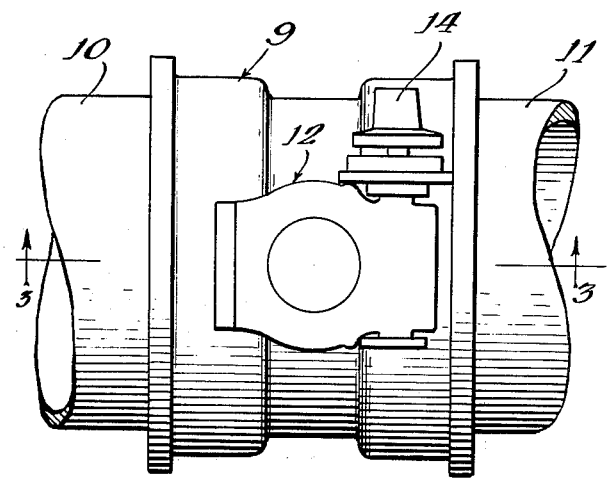
FIGURE 2 is an enlarged fragmentary elevation of the valve shown in FIGURE 1.
Figure 1:
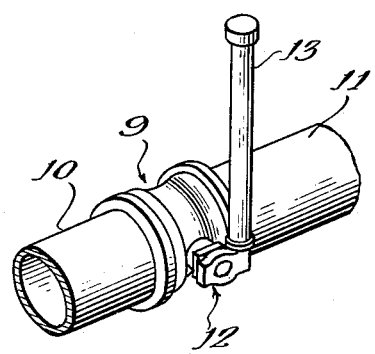
FIGURE 1 is a broken perspective view of a valve mounted in a buried pipe line.

The valves of this invention may be used in many industries and are a matter of frequent use in water works, power plant, manufacturing and industries of like nature. In FIGURE 1 there is an illustration of a valve 9 connected with pipe sections 10 and 11, the valve being operated by a geared operator 12 attached to the shaft of the valve. Some services such as water works often require a valve to be underground, and in such instances the valve may be operated from the ground level through an access tube 13 sitting over a standard American Water Works Association square nut 14 on the geared valve operator 12. As better shown in FIGURE 3, the operator 12 is connected to an extension of the central shaft 15 of the valve for the purpose of opening and closing the valve.

Figure 3:
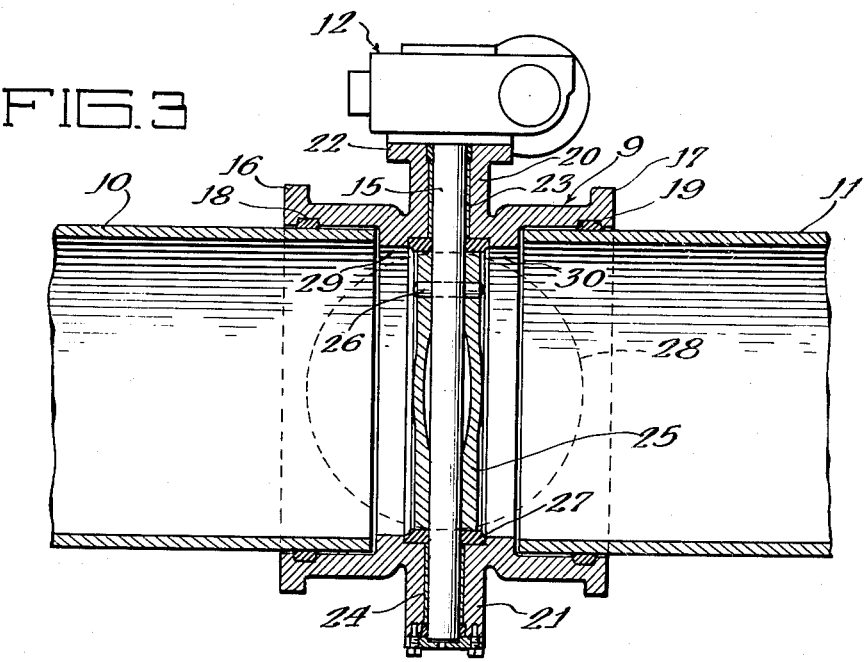
FIGURE 3 is a cross sectional view through the valve taken substantially along line 3—3 in FIGURE 2.

The structure of the butterfly valve is best illustrated in FIGURE 3. The housing of the valve 9 is a cast annular shaft member having annular flanges 16 and 17 into which the pipe sections 10 and 11 may be connected. In the illustration of FIGURE 3 the connection is performed by what is often referred to as a ring-tite construction including an annular rubber gasket 18 and 19. The housing also has diametrically opposite sleeve portions 20 and 21 for providing the bearings for the shaft 15. The upper sleeve portion may be provided with a flange 22 for supporting the valve operator 12. Each of the sleeve portions are carefully machined to provide the trunnion bearing for the shaft, the bearing itself being a sleeve 23 and 24 of nylon bearing material. The bearings for the shaft were accurately positioned so that the center line thereof intersects and is at a right angle to the center line through the valve in the direction of fluid flow.

The valve closure includes a disc 25 pinned to the shaft by a cold-formed rivet 26 and a resilient seat 27 of rubber material. The disc 25 is accurately made so that its periphery is circular except for the portions surrounding the shaft referred to as the hub portions of the disc. In general, the hub portions are flat and the shape of the seat is made to conform thereto. When the disc is opened to the dotted line position 28 illustrated in FIGURE 3, the hub portions of the disc remain in sealing contact with the seat.

The inner surface of the resilient seat contacted by the disc is accurately formed by molding it in place in the casting 9 to insure that the circular portions thereof are centered about the center line through the valve. Two surfaces, 29 and 30 on either side of the seat, are accurately machined on the center line of the valve so as to be concentric with the center line. These surfaces are the guides by which the valve seat material is accurately located.

The method of placing the seat in the valve housing is illustrated in FIGURES 4 and 5. A lower mold member 31 is placed upon the bed 32 of a press and the outer surface of the mold is circular so as to engage and pilot upon the circular accurately machined surface 29 in the valve housing 9. The lower mold member has a shoulder 33 immediately above the piloted section and an accurately formed circular surface 34 immediately thereabove. The surface 34 is flattened at the hub areas of the seat such as 35 and 36 best seen in FIGURE 5. The surfaces 34, 35 and 36 are accurately formed and centered within the valve housing when the mold member pilots upon the circular surface 29 in the valve housing. The resultant seat surface of the resilient material 27, conforming to the mold will thus be extremely accurately formed.

In the process of forming the seat a measured amount of raw rubber stock (unvulcanized rubber compound ready to be vulcanized by action of pressure, temperature and time) is placed in the cavity formed between the mold member 31 and the valve housing. An upper mold member 37 also pilots upon the circular surface 30 in the valve housing as well as operating to close the cavity in which the rubber material is trapped. The upper mold member also has a bevel surface 38 at its outer end which meets the surface 34 on the lower mold member. The ram 39 of the press holds the mold parts and valve in their assembled relation and applies the pressure necessary to the vulcanization of the seat material. Heat may be added as needed during this process. The housing is maintained in position on the mold by a pair of stripper bolts 40 and 41 threaded into the lower mold member 31 and having a tapered section 42 and 43 respectively for forming the bore through the seat which is to receive the shaft of the valve. The tapered bore through the seat material is smallest at the juncture of the bore with the inner surface of the seat. The tightest area on the valve shaft will thus occur at the seat surface. The stripper bolts or pins are each accurately made to pilot on the machined bearing surfaces 44 and 45 respectively so that the combination of the mold members piloting on the surfaces 29 and 30 in the valve body and the stripper bolts piloting upon the machined bearing surfaces 44 and 45 insures that the seat material will be centered and properly located in alignment with the trunnion bearings for the valve shaft.

Referring to FIGURES 6 to 8, it will be noted that the valve body may be cast with different forms of flanges for accommodating various commercially available type connections. In FIGURE 6 the flange 46 is formed in accordance with the American Water Works Association bell for standard bell and spigot fittings. The seat 47 in the valve is the same as that previously described. The valve is provided with circular surfaces 48 and 49 on either side of the seat so that the seat material will be accurately placed as previously described. The bearings for the valve shaft are identical to those previously described.

In FIGURE 7 a different form of flange 50 is illustrated, one for making a connection called a victaulic coupling. Malleable iron half housings 51 enclose a continuous rubber ring 52 coupling the pipe 53 to the flange 50 of the valve.

In FIGURE 8 the flange 53 of the valve is particularly made to receive an American Double-X Mechanical Joint. The flange is prepared to receive bolts 54 holding a follower ring 55 against a rubber gasket 56. The sealing occurs between the flange 53 on the valve and the outer surface of the pipe 57 by virtue of the construction just described. In each of the valve constructions shown in FIGURES 5, 6, and 7 the seat 47 is identical, as are the machined surfaces 48 and 49. The variation in construction is in the flange for receiving the connecting pipe, the remaining parts of the valve being identical in each instance.

The foregoing detailed description is given for clearness of understanding only and no unnecessary limitations are to be understood therefrom, as modifications will be obvious to those skilled in the art.

I claim:

1. A butterfly valve, comprising:
    a unitary valve body of two unitized portions including an outer annular portion of metal and an inner annular portion of rubber-like material,
    the metal portion having a pair of opposite trunnions on a common center line extending across the valve body and across the direction of flow through the valve,
    a pair of spaced smooth circular cylindrical surfaces on said metal body portion one on either side of said common center line constructed and arranged to form an annular space therebetween and having a common axis extending longitudinally of the valve body, said axis intersecting said common center line centrally between the trunnions and substantially normal to said center line,
    said annular portion of rubber-like material having a valve seating surface portion concentric with and positioned between said cylindrical surfaces on said metal body portion and completely filling said annular space, whereby said surface portion is centrally positioned between the trunnions,
    means maintaining said valve seating surface portion in said position consisting of, in its entirety, a mass of molded in place rubber-like material in said metal valve body portion,
    a valve disc in said valve body having an outer edge cooperating with said valve seating surface to close the valve, and
    a shaft supporting said valve disc and mounted in said trunnions.

2. A unitary valve body for a butterfly valve, comprising:
    an outer annular portion of metal and an inner annular portion of rubber-like material united as a unit,
    said annular metal body portion having means for connection to fluid crying pipe for fluid flow through the valve,
    trunnion bearings diametrically opposite in said metal body portion having a common center line extending across the direction of fluid flow,
    said metal body portion having a pair of spaced circular cylindrical surfaces constructed and arranged to form an annular space therebetween and centered about a common axis intersecting said trunnion center line centrally between said trunnions,
    said surfaces being spaced apart one on each side of said trunnion center line and facing inwardly of the valve housing;
    said body portion of rubber-like material having an inner valve seating surface between said trunnion bearings concentric with and positioned between said cylindrical surfaces and completely filling said annular space, said surface being maintained in said position by a mass, in its entirety, of molded in place rubber-like material in said metal portion of the valve body,
    and said resilient seat material having diametrically opposite openings therethrough centered on said trunnion axis for sealing engagement with a closure carrying shaft journalled in said bearings.

3. A unitary valve body as specified in claim 2 wherein the mass of molded in place rubber-like material has walls forming said diametrically opposite openings on said trunnion axis with a taper oriented to position the smallest area of the opening at an intersection of said opening walls with said valve seating surface of said rubber-like material.

4. A unitary valve body for a butterfly valve, comprising:
    an annular outer portion of metal and an inner annular portion of rubber-like material united as a unit,
    said annular metal body portion having means at its extremities for connection to fluid carrying pipe for fluid flow through the valve,
    trunnion bearings opposite in said metal body portion having a common center line extending across the direction of fluid flow through the valve,
    said metal body portion having a pair of spaced cylindrical surfaces spaced apart one on each side of said trunnion center line constructed and arranged to form an annular space therebetween and facing inwardly of the valve housing, at least one of said cylindrical surfaces being a smooth circular surface having an axis intersecting said trunnion center line centrally between said trunnions,
    said inner annular portion of rubber-like material having an inner valve seating surface between said trunnion bearings concentric with and positioned between said smooth circular cylindrical surfaces and completely filling said annular space so as to be centered between said trunnions, and
    said valve seating surface being maintained in said position by a mass, in its entirety, of molded in place rubber-like material in said metal portion of the unitary valve body between said cylindrical surfaces.

5. A unitary valve body as specified in claim 4 wherein said mass of molded in place rubber-like material has a pair of opposite openings therethrough centered on said trunnion center line for passage of a valve disc carrying shaft through the trunnions and said openings, said mass having walls forming said openings with a taper positioning the smallest portion of the opening at an intersection of the opening walls with said seating surface portion.

(References on following page)

References Cited by the Examiner

UNITED STATES PATENTS

| | | | |
|---|---|---|---|
| 1,894,644 | 1/33 | Sturdevant | 18—59 |
| 2,409,759 | 10/46 | Hoskins. | |
| 2,448,483 | 8/48 | Bassett | 18—59 |
| 2,573,177 | 10/51 | Bohlen | 29—157.1 |
| 2,669,011 | 2/54 | Brumbaugh | 29—157.1 |
| 2,936,153 | 5/60 | Gaffin | 251—306 |
| 2,991,043 | 7/61 | Saar | 251—306 |
| 3,010,695 | 11/61 | Banks | 251—368 XR |
| 3,050,781 | 8/62 | Killian | 18—59 XR |
| 3,105,672 | 10/63 | Kinney et al. | 251—306 |
| 3,122,353 | 2/64 | Killian | 251—306 |

ISADOR WEIL, *Primary Examiner.*

WILLIAM F. O'DEA, *Examiner.*